UNITED STATES PATENT OFFICE.

JOSEPH H. McDONALD AND CHARLEY A. HOPSON, OF SHERMAN, TEXAS, ASSIGNORS TO A. B. C. CANDY COMPANY, OF SHERMAN, TEXAS.

SUGARED NUT-CANDY.

No. 931,137. Specification of Letters Patent. Patented Aug. 17, 1909.

Application filed March 24, 1903. Serial No. 422,995.

*To all whom it may concern:*

Be it known that we, JOSEPH H. MCDONALD and CHARLEY A. HOPSON, citizens of the United States, residing at Sherman, in the county of Grayson and State of Texas, have invented certain new and useful Improvements in Sugared Nut-Candy, of which the following is a specification.

The purpose of the present invention is to provide a candy which will not become sticky in damp weather or harden when kept a comparatively short time, and which will be free from the excessive sweetness of candy made from sugar or like saccharine matter.

The invention specifically relates to a candy containing the meat or kernels of nuts and commonly designated peanut candy.

The following ingredients are employed in about the proportions stated for making approximately thirty pounds of finished candy, namely, white granulated sugar fifteen pounds, crystal A glucose five pounds, No. 1 Spanish peanuts, shelled, ten pounds, water three and one-quarter quarts, common salt—chlorid of sodium—one ounce.

The following steps are employed in compounding the ingredients to produce the candy: The sugar, glucose and three quarts of the water are mixed in a copper kettle, which latter is placed on a furnace, the mixture being thoroughly stirred until dissolved, after which the kettle is covered and heated to approximately two hundred and twenty degrees, after which the cover of the kettle is removed and the peanuts added and the latter cooked to approximately two hundred and sixty degrees. The dampers of the furnace are now closed and the mixture cooked about two minutes longer, after which the kettle is removed from the furnace and the salt previously dissolved in the one-quarter quart of cold water, is added and the whole thoroughly stirred until bubbling ceases. The mixture is then dipped up and down with a good sized dipper from eighteen to twenty-five times, the dipper being elevated about three feet above the kettle. After dipping the candy it is spread on greased tins and allowed to cool.

A candy produced by the process herein stated, will not become sticky when exposed to dampness and will not harden within a reasonable length of time. The addition of the salt, or the chlorid of sodium, counteracts the too sweet taste of all sugar candy, rendering it more palatable and giving it a delightful flavor. The addition of the salt in solution while the candy is very hot and the agitation produced by the dipping, causes the candy to sugar as it grows cold.

Having thus described the invention, what is claimed as new is:

The process of manufacturing a confection, the same consisting of agitating a mixture of sugar, glucose and water in an open vessel until the sugar is dissolved, then closing said vessel and heating the same to a temperature of approximately two hundred and twenty degrees, then removing the cover of the vessel and adding to the boiling mixture kernels or meats of nuts and further heating the mixture to a temperature of about two hundred and sixty degrees and maintaining it at this temperature until the kernels are cooked, then adding a cool solution of chlorid of sodium to the heated mixture and simultaneously stirring the mixture until all bubbling ceases, then dipping the mixture a number of times, and finally spreading the mixture upon a surface and allowing it to cool and harden.

In testimony whereof we affix our signatures in presence of two witnesses.

JOSEPH H. McDONALD. [L. S.]
CHARLEY A. HOPSON. [L. S.]

Witnesses:
R. M. HUTT,
A. E. JAMISON.